(12) United States Patent
Rinker et al.

(10) Patent No.: US 11,618,103 B2
(45) Date of Patent: Apr. 4, 2023

(54) METHOD AND CLAMPING FIXTURE FOR LASER WELDING BATTERY FOILS TO A BATTERY TAB

(71) Applicant: GM Global Technology Operations LLC, Detroit, MI (US)

(72) Inventors: Teresa J. Rinker, Royal Oak, MI (US); Hongliang Wang, Sterling Heights, MI (US); Chih-Chang Chen, Rochester Hills, MI (US); Erik B. Golm, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 288 days.

(21) Appl. No.: 17/085,162

(22) Filed: Oct. 30, 2020

(65) Prior Publication Data

US 2022/0134478 A1 May 5, 2022

(51) Int. Cl.
*B23K 26/244* (2014.01)
*B23K 26/70* (2014.01)
*B23K 101/36* (2006.01)

(52) U.S. Cl.
CPC .......... *B23K 26/244* (2015.10); *B23K 26/702* (2015.10); *B23K 2101/36* (2018.08)

(58) Field of Classification Search
CPC B23K 26/244; B23K 26/702; B23K 2101/36; B23K 37/0435; B23K 26/21; B23K 26/02; Y10T 29/49144; Y10T 29/49149; Y10T 29/53209
See application file for complete search history.

(56) References Cited

U.S. PATENT DOCUMENTS

| 9,149,888 | B2 * | 10/2015 | Bollegue | B23K 26/702 |
| 11,095,004 | B2 * | 8/2021 | Tao | B23K 26/32 |
| 2012/0000964 | A1 * | 1/2012 | Sigler | B23K 1/06 228/111.5 |

* cited by examiner

*Primary Examiner* — Donghai D Nguyen
(74) *Attorney, Agent, or Firm* — Vivacqua Crane, PLLC

(57) ABSTRACT

A method and fixture for welding a battery foil-tab assembly is disclosed. The fixture includes a first clamp member having a first clamping surface defining an opening extending into the first clamp member and a second clamp member having a protrusion surrounding a weld slot. The opening of the first clamp member is configured to receive a portion of the protrusion with the battery foil-tab assembly disposed therebetween. The second clamp member is moveable toward the first clamp member to align the weld slot of the second clamp member with the opening of the first clamp member, thereby causing the protrusion to cooperate with the opening of the first clamp to deflect a portion of the battery foil-tab assembly out of a plane parallel with the battery foil-tab assembly. A laser beam is directed at the out of plane portion to laser weld the battery foil-tab assembly.

14 Claims, 4 Drawing Sheets

METHOD AND CLAMPING FIXTURE FOR LASER WELDING BATTERY FOILS TO A BATTERY TAB

INTRODUCTION

The present disclosure relates to joining a stack of battery foils to a battery tab, more particularly to a method and a fixture for laser welding a stack of battery foils to a battery tab.

Electric vehicles utilize onboard battery packs for the storage of electrical energy. A battery pack is formed of a plurality of battery cells, wherein each of the battery cells includes an anode current collector and a cathode current collector. The anode current collectors extending from the plurality of battery cells are stacked and joined to a battery tab that functions as a negative electrode. Similarly, the cathode current collectors are stacked and joined to a battery tab that functions as a positive electrode. The battery tabs are used to conduct electrical energy from the battery pack to an external electric device or allow electrical energy from an external source to recharge the battery pack.

The current collectors are typically formed of thin sheets of aluminum or copper foil having a thickness of between 0.004 and 0.03 millimeters. The battery tabs are typically formed or copper or aluminum sheets having a thickness of approximately 0.1 millimeters and 0.5 millimeters. Laser welding has been used for joining a stack of thin sheets of foil to a battery tab with some success. Laser welding forms strong joints, however as the number of sheets of foil increases, laser welding becomes more difficult due to uneven heat generated through the larger number of sheets of foil. Large numbers of sheets of foil are inherently difficult to clamp and to maintain a preferred zero gap condition between adjacent sheets of foil and the battery tab prior to laser welding. Gaps between the sheets of foil during welding act as insulation leading to increased heat accumulation and potential burn-through in some foils, while others may be insufficiently bonded.

Thus, while laser welding of stacked sheets of foil to battery tabs achieve their intended purpose, there is a need for a fixture and method to clamp and maintain a preferred zero gap condition between adjacent sheets of foil and to the battery tab prior to and during the laser welding process to ensure a structurally strong and efficient foil-to-tab laser weld.

SUMMARY

According to several aspects, a clamping fixture for welding a battery foil-tab assembly is disclosed. The fixture includes a first clamp member having a first clamping surface defining an opening extending into the first clamp member, wherein the first clamping surface is configured to receive the battery foil-tab assembly in such a way that the battery foil-tab assembly covers the opening; and a second clamp member having an exterior surface, a second clamping surface opposite the exterior surface, and a weld slot extending from the exterior surface to the second clamping surface, wherein the second clamping surface defines a protrusion surrounding the weld slot. The opening of the first clamp member is configured to receive a portion of the protrusion surrounding the weld slot of the second clamp member with the battery foil-tab assembly disposed therebetween. The second clamp member is moveable toward the first clamp member to align the weld slot of the second clamp member with the opening of the first clamp member, thereby causing the protrusion to cooperate with the opening of the first clamp to deflect a portion of the battery foil-tab assembly out of a plane parallel with the battery foil-tab assembly.

In an additional aspect of the present disclosure, the protrusion surrounding the weld slot of the second clamp member is configured to cooperate with the opening of the first clamp member to plastically deform the portion of the battery foil-tab assembly.

In another aspect of the present disclosure, the protrusion is configured to deflect a predetermined weld site of the battery foil-tab assembly out of the plane.

In another aspect of the present disclosure, the protrusion extends about 0.5 mm from the second clamping surface of the second clamp member.

In another aspect of the present disclosure, the opening of the first clamp member defines a recess configured to receive the protrusion of the second clamp member. The recess includes a shape complementary to a shape of the protrusion.

In another aspect of the present disclosure, the opening of the first clamp member and the weld slot of the first clamp member includes a diameter sufficiently large to receive a laser beam effective to form a laser weld joining the overlap portion of the battery foil-tab assembly.

In another aspect of the present disclosure, the fixture further includes a lever member configured to selectively apply a force to the exterior surface of the second member urging the second member toward the first member to clamp the battery foil-tab assembly therebetween.

In another aspect of the present disclosure, the protrusion of the second clamp member is configured to cooperate with the opening of the first clamp member to deflect an overlap portion of the battery foil-tab assembly out of plane.

In another aspect of the present disclosure, the fixture further includes a guide member configured to guide the second clamp member toward and apart from the first clamp member.

In another aspect of the present disclosure, the opening extending into the first clamp member is sufficiently deep to prevent a laser beam from welding the battery foil-tab assembly to the first clamp member.

According to several aspects, a method for laser welding a stack of battery foils to a battery tab is disclosed. The method includes arranging a stack of battery foils in overlapping arrangement with a battery tab such that an interior surface of the stack of battery foils is in abutting contact with an interior surface of the battery tab to define an overlap portion. The overlap portion includes a faying interface parallel with a plane A and at least one predetermined laser weld site. The method further includes deflecting the overlap portion out of the plane-A and directing a laser beam at the predetermined laser weld site to effectual a laser weld joining the stack of battery foils to the battery tab.

In an additional aspect of the present disclosure, wherein deflecting the overlap portion out of the plane-A includes applying a clamping force onto the overlap portion sufficient to deflect the overlap portion out of plane-A such that any gaps within the stack of foils and between the stack of foils and battery tab is eliminated.

In another aspect of the present disclosure, wherein deflecting the overlap portion out of the plane-A includes applying a clamping force onto the at least one predetermined laser weld site sufficient to deflect the at least one predetermined laser weld sites out of the plane-A.

In another aspect of the present disclosure, wherein deflecting the at least one predetermined laser weld site out of the plane-A includes plastically deforming the at least one predetermined laser weld site to define an external curved surface having an apex.

In another aspect of the present disclosure, wherein directing a laser beam at the predetermined laser weld site includes directing the laser beam at the apex of the external curved surface.

In another aspect of the present disclosure, wherein the external curved surface is an exterior surface of the battery tab.

According to several aspects, a method for laser welding a battery foil-tab assembly is disclosed. The method includes disposing the battery foil-tab assembly onto a first clamp member having an opening, wherein the battery foil-tab assembly includes a faying interface parallel with a plane-A; disposing a second clamp member onto the battery foil-tab assembly and against the first clamp member, wherein the second clamp member includes a weld slot in axial alignment with the opening of the first clamp member and a protrusion surrounding the weld slot; applying a clamping force onto the second clamp member to cause the protrusion to deflect a portion of the battery foil-tab assembly out of the plane-A; and directing a laser beam at the portion of the battery foil-tab assembly out of the plane-A to effectuate a laser weld.

In an additional aspect of the present disclosure, wherein the protrusion is insertable into the opening of the first clamp member thereby deflecting the portion of the battery foil-tab assembly into the opening.

In another aspect of the present disclosure, wherein deflecting the portion of the battery foil-tab assembly includes plastic deformation of the portion of the battery foil-tab assembly.

In another aspect of the present disclosure, wherein the portion of the battery foil-tab assembly plastically deformed is a predetermined laser weld site.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
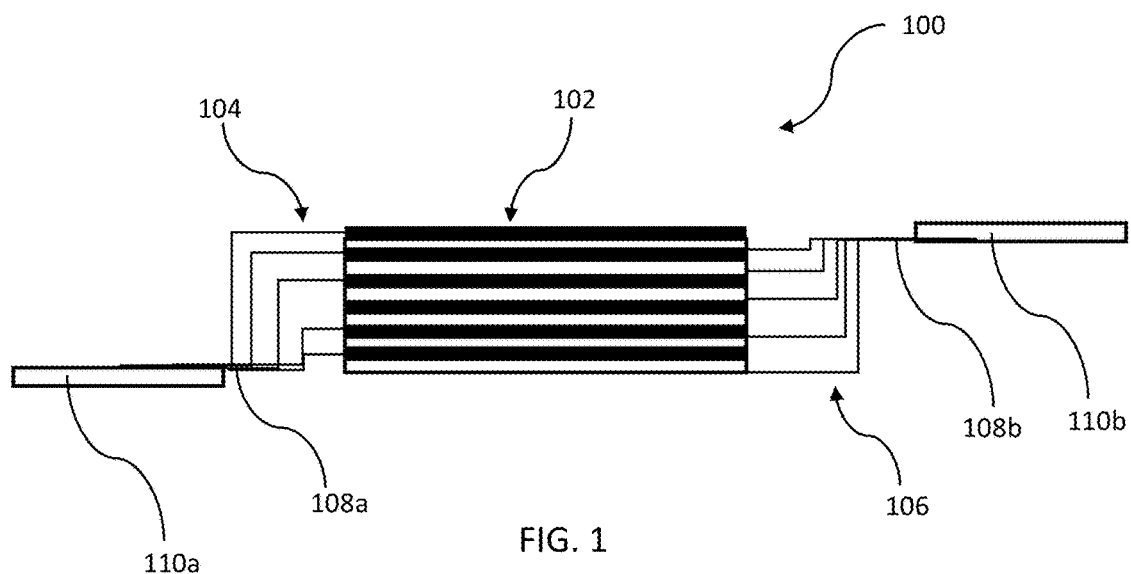
FIG. 1 is a diagrammatic cross-sectional side view of a battery pack having a laser welded stacked foil-tab assembly, according to an exemplary embodiment.

Shown in FIG. 1 is a diagrammatic cross-sectional view of a battery pack 100 having a plurality of internal battery cells 102. Each internal battery cell 102 includes an anode current collector 104 and a cathode current collector 106. The current collectors are formed of foil sheets having a thickness of about 0.004 millimeters (mm) to about 0.03 (mm). The plurality of anode current collectors 104 and cathode current collectors 106 extending from the battery cells 102 external to the battery pack 100 are arranged in respective stacks of anode and cathode collectors 108a, 108b.

The anode foil collectors 104 may be formed of sheets of foil, also referred to as foil sheets, having elemental copper or copper alloy, and may include a nickel coating. The cathode current collectors 106 may be formed of foil sheets of elemental aluminum or aluminum alloy. A stack of foil sheets of current collectors 104, 104 is also referred to as a stack of battery foils 108 or in brevity as battery foils 108.

The stacks of battery foils 108a, 108b are laser welded to respective battery tabs 110a, 110b to facilitate electrical connection to an electrical device or to an external electrical system (not shown) such as an electrical bus system for an electric vehicle. The battery tabs 110a, 110b may be formed of the same material as the battery foils 108a, 108b to which the battery tab 110 is laser welded and has a thickness of between 0.1 mm and 0.5 mm. The disclosure below provides a method and a foil gap closing fixture 300 for laser welding a stack of battery foils 108 to a battery tab 110 in order to provide a robust electrical connection between the battery foils 108 and battery tab 110.

Figure 2:
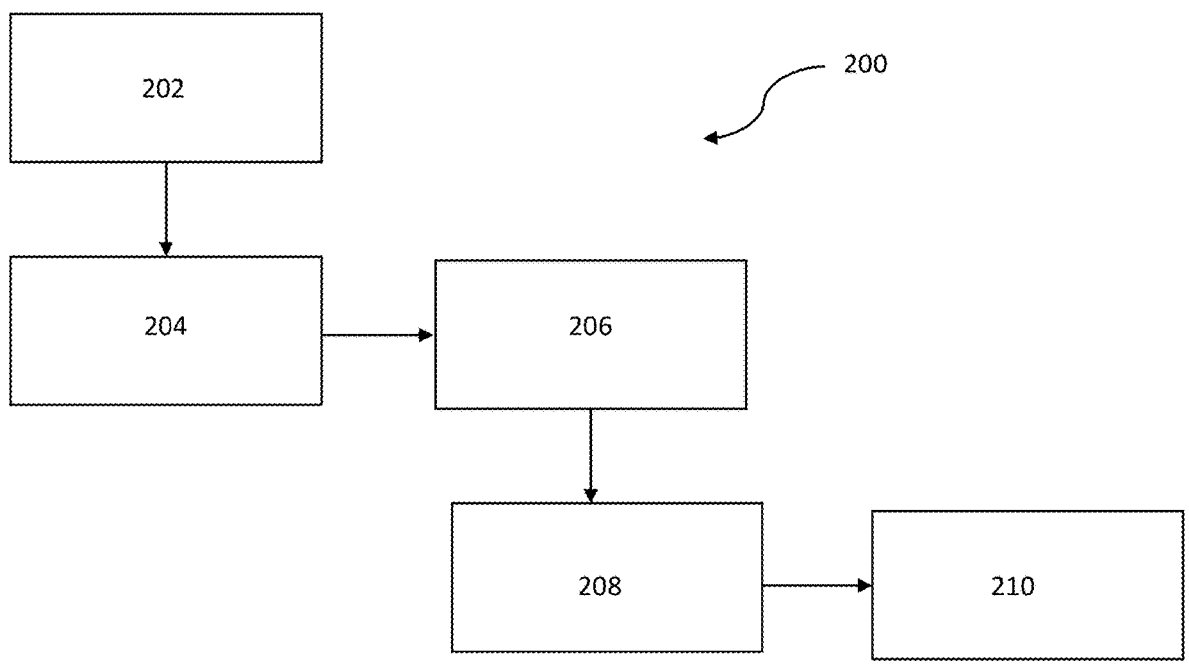
FIG. 2 is a block flow diagram of a method for laser welding a stacked foil-tab assembly, according to an exemplary embodiment.

FIG. 2 is a block flow diagram for a method 200 for laser welding a stack of battery foils 108 to a battery tab 110. FIGS. 3A-3D shows the arrangements of the stack of battery foils 108 and the battery tab 110 during the implementation of the method 200.

Figure 3A:
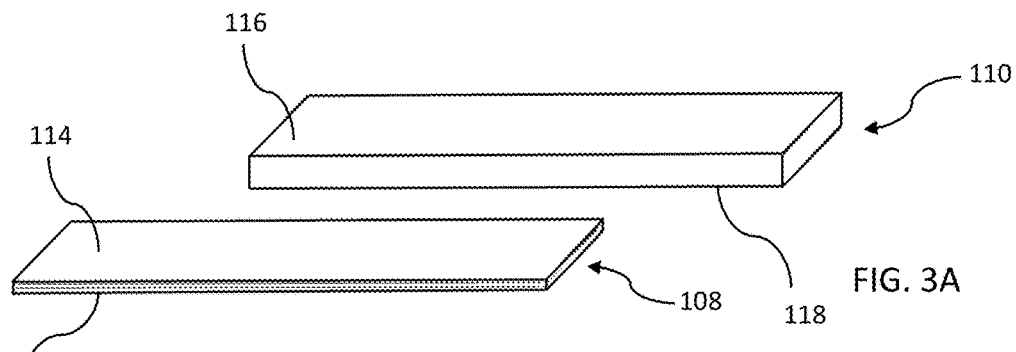
FIGS. 3A-3D show the arrangements of a stack of battery foils and a battery tab during the implementation of the method of FIG. 2.

The method begins in Block 202 and referring to FIG. 3A, the stack of battery foils 108 is arranged in overlapping arrangement with the battery tab 110. The stack of battery foils 108 includes an exterior surface 112 and interior surface 114 opposite the exterior surface 112. The battery tab 110 includes an exterior surface 116 and an interior surface 118 opposite the exterior surface 116. The stack of battery foils 108 and the battery tab 110 are arranged such that the interior surface 118 of the battery tab 110 is in an overlapping position with the interior surface 114 of the stack of battery foils 108.

Figure 3B:
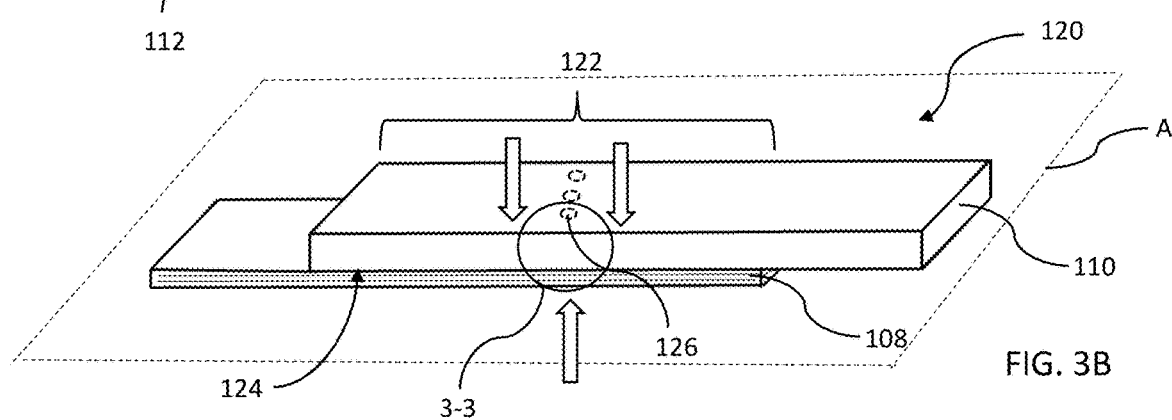

Moving to Block 204 and referring to FIG. 3B, the stack of battery foils 108 and the battery tab 110 are moved into a contact position, wherein a portion of the interior surface 118 of the battery tab 110 is in abutting contact with a portion of the interior surface 114 of the stack of battery foils 108 to form a battery foil-tab assembly 120. The overlapping portions of the stack of battery foils 108 and the battery tab 110, also referred to as an overlap portion 122 of the battery foil-tab assembly 120, defines a faying interface 124 that is parallel to a plane-A. The overlap portion 122 includes a plurality of predetermined laser weld sites 126.

Figure 3C:
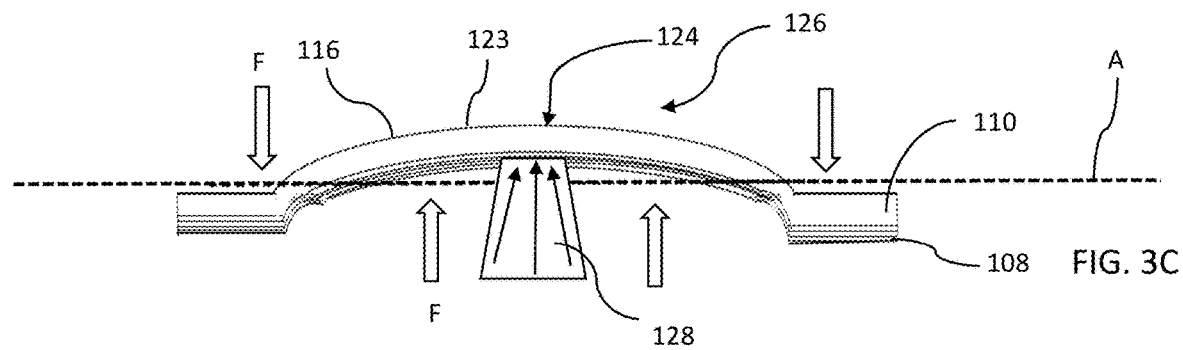

Moving to Block 206 and referring to FIGS. 3B and 3C a clamping force, indicated by the arrows, is applied to the overlap portion 122 in such a way to urge the overlap portion 122 out of the plane-A causing the stacked battery foils 108 and the battery tab 110 to compress together, thereby reducing, if not eliminating, any insulating air gaps between adjacent sheets of foil 108 and the battery tab 110. The entire overlap portion 122 may also be deformed by deflecting or bending the overlap portion 122 out of the plane-A. The clamping force may be applied on the overlap portion 122 or may be applied on both the overlap portion and the stack battery foils 108.

In one embodiment, the clamping force is applied to each of the predetermined laser weld sites 126, within the overlap portion 122, in such a way to urge the predetermined laser weld sites 126 out of the plane-A. A sufficient clamping force F may be applied to deform the predetermined laser weld sites 126 out of the plane-A. The deformation may include that of plastic deformation. FIG. 3C shows a detailed section 3-3 of FIG. 3B during the application of the clamping force F. The out of plane-A deflection or deformation of the predetermined laser weld sites 126 or overlap portion 112 causes the stacked battery foils 108 and the battery tab 110 to compress together, thereby reducing, if not eliminating, any insulating air gaps between adjacent sheets of foil 108 and the battery tab 110.

The out of plane-A deformation of the predetermined laser weld sites 126 includes an external curved surface 123 having an apex 124 extending away from the plane-A. FIG. 3C shows the curve surface 123 to be that of the exterior surface 116 of the battery tab 110. In another embodiment, the clamping force may be applied in such a way that the resulting external curved surface 123 is that of the exterior surface 112 of the stacked battery foils 108.

The out of plane-A deflection or deformation of the predetermined laser weld sites 126 or the overlap portion 122 of the battery foil-tab assembly 120 applies tension to the sheets of foil 108 causing the sheets to pull tight against each other and against the interior surface 118 of the battery tab 110, thus compressing the sheets of foil 108 and battery tab 110 to minimize, if not eliminate, any gaps between adjacent sheets of foils and the battery tab 110. The elimination, or at least minimization, of the size of the gaps allows for a structurally robust laser welded battery foil-tab assembly 120.

Moving to Block 208 and continuing reference to FIG. 3C, a laser beam 128 is directed at the predetermined laser weld site 126 to effectuate a laser weld joining the stack of battery foils 108 to the battery tab 110. It is preferable that the laser beam 128 is directed at the apex 124 of the curved exterior surface 123. It also preferable that the curved exterior surface 123 is the exterior surface 116 of the battery tab 110. The laser beam 128 may direct on the exterior surface 123 to form a plurality of spot welds 130 or line welds 130 having a predetermined pattern 127 in the overlap portion 122, best shown in FIG. 3D. The spot welds 130 or weld lines 130 may extend along a width (W) or along a length (L) of the overlap portion 122.

Figure 3D:
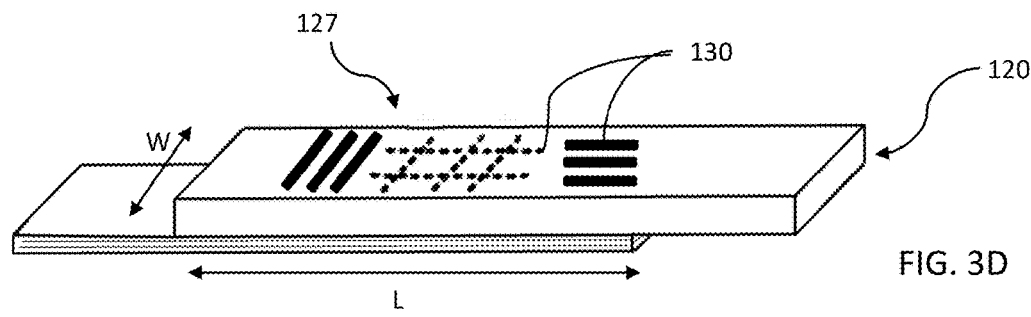

Moving to Block 210 and referring to FIG. 3D, upon completion of effectuating the laser weld, the battery foil-assembly is cooled to allow for the laser weld to solidified and the clamping force is removed.

Figure 4:
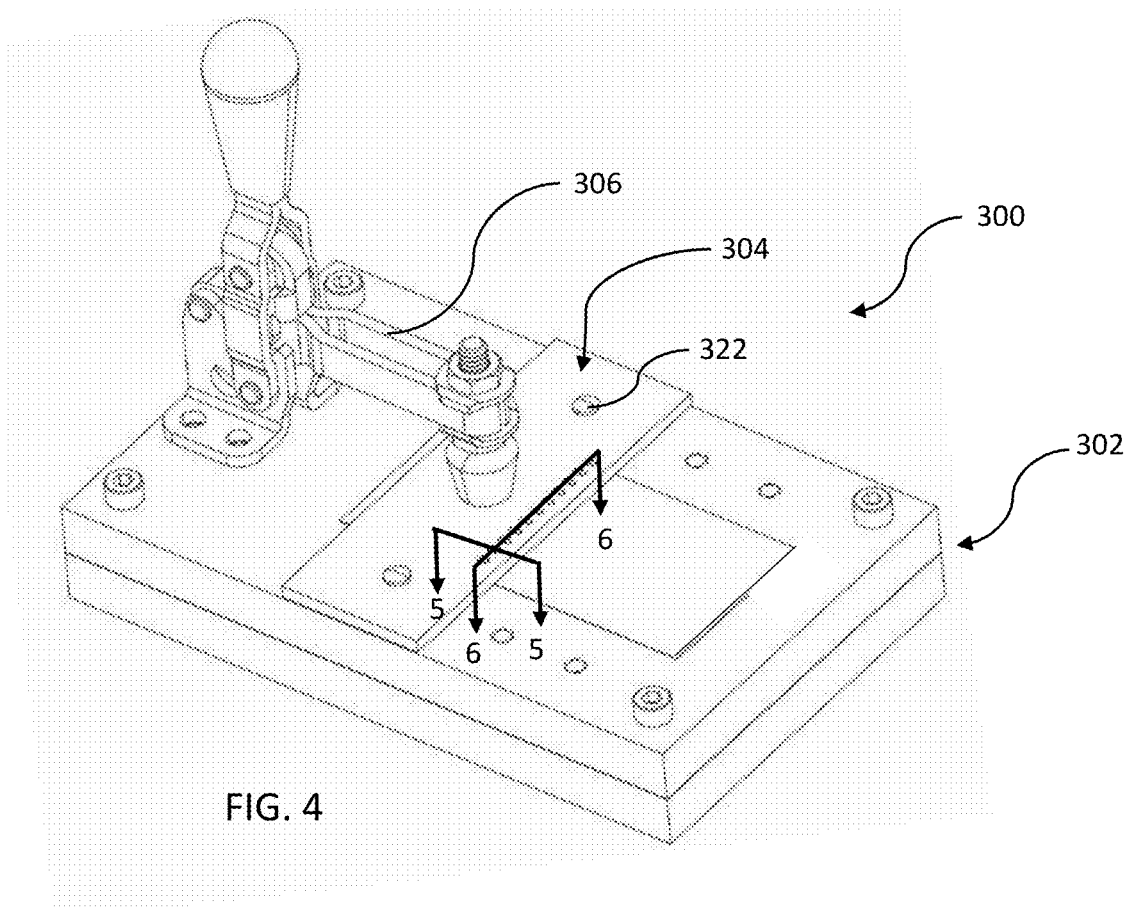
FIG. 4 is a perspective view of a fixture for implementing the method of FIG. 2, according to an exemplary embodiment.

FIG. 4 shows a perspective view of a clamping fixture 300 for applying a clamping force to the foil-tab assembly 120 to deflect or deform the plurality of predetermined laser weld sites 126 of the foil-tab assembly 120 out of plane-A for laser welding the battery foils 108 to the battery tab 110.

Figure 5:
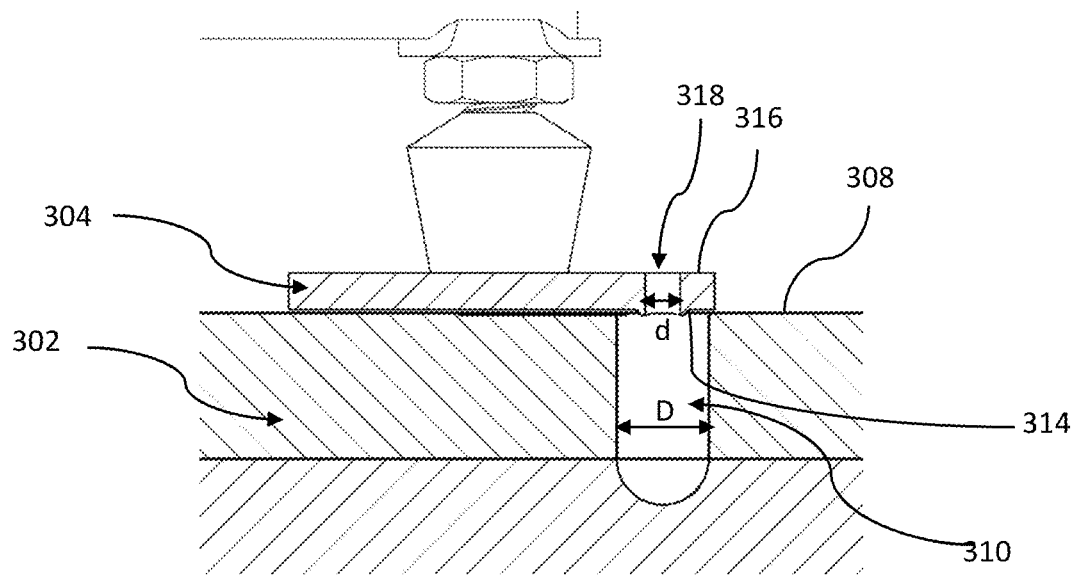
FIG. 5 is a cross-sectional view of the fixture of FIG. 4 across line 5-5, according to an exemplary embodiment.
Figure 6:
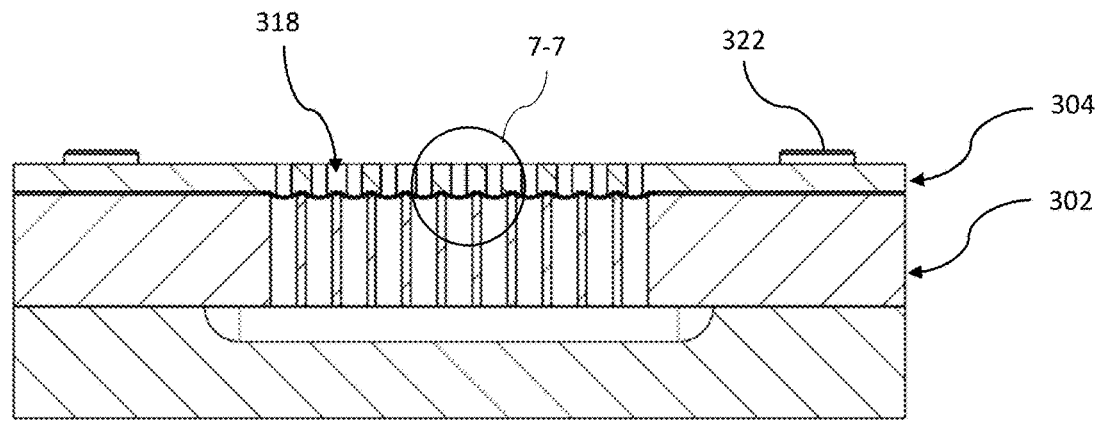
FIG. 6 is a cross-sectional view of the fixture of FIG. 4 across line 6-6, according to an exemplary embodiment.
Figure 7:
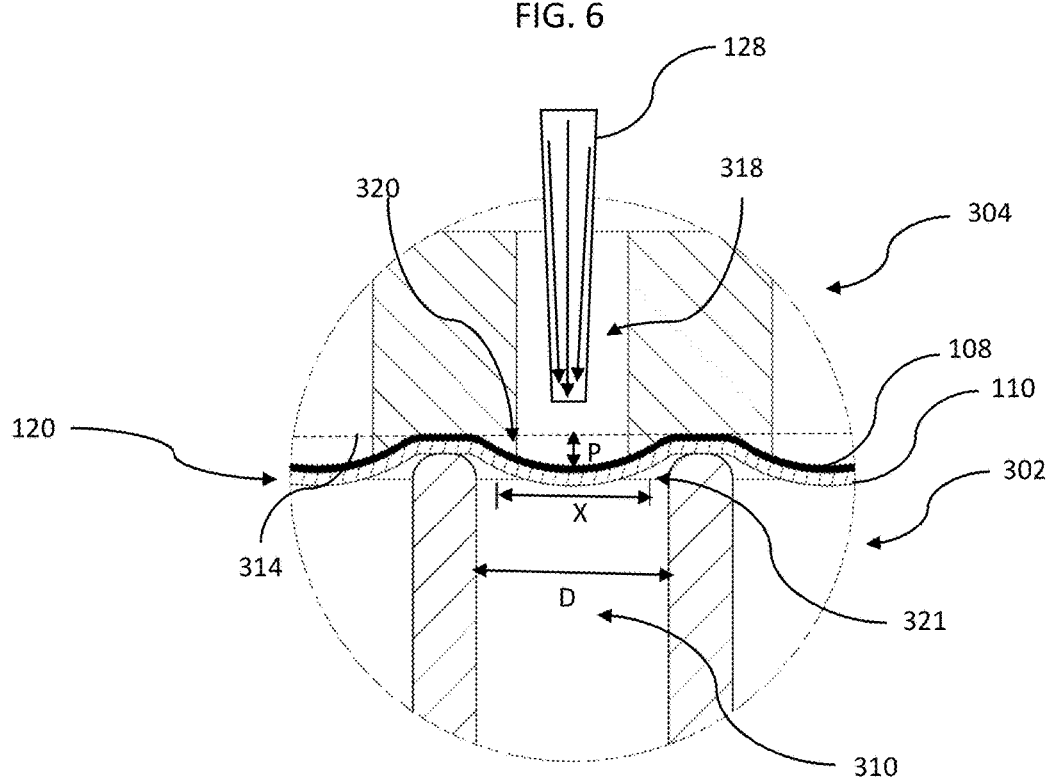
FIG. 7 is a detailed view of section 7-7 of FIG. 6.

FIG. 5 shows a cross-sectional view of the clamping fixture 300 of FIG. 4 across line 5-5. FIG. 6 shows a cross-sectional view of the clamping fixture 300 of FIG. 4 across line 6-6. FIG. 7 shows a detailed sectional view 7-7 of FIG. 6.

Referring to both FIGS. 4 and 5, the clamping fixture 300 includes a first clamp member 302, a second clamp member 304, and a clamp arm 306 configured to exert a clamping force to compress the first clamp member 302 to the second clamp member 304. The first clamp member 302 includes a clamping surface 308 onto which the battery foil-tab assembly 120 is disposed. Best shown in FIGS. 5, the clamping surface 308 of the first clamp member 302 defines a plurality of openings 310 that extends into the first clamp member 302.

The second clamp member 304 includes a clamping surface 314 and an exterior surface 316 opposite the clamping surface 314. The second clamp member 304 is disposed proximal to the first clamp member such that the clamping surface 314 of the second clamp member 304 is facing the clamping surface 308 of the first clamp member 302. The second clamp member 304 defines a plurality of slot openings 318, also referred to as weld slots 318, extending from the exterior surface 316 to the clamping surface 314.

Referring to FIGS. 5, 6, and 7, the slot openings 318 of the second clamp member 304 are co-axially alignable with the openings 310 of the first clamp member 302 during welding operations when executing the method 200. Best shown in FIG. 5, the openings 310 of the first clamp member 302 includes a first diameter (D) and the slots openings 318 of the second member includes a second diameter (d). The first diameter (D) is larger than the second diameter (d). It should be appreciated that the shape of the slot openings 318 and corresponding openings 310 are not limited to circular in shape, but may be elongated slots that extend the width W or length L of the overlap portion 122.

Best shown in FIG. 7, the clamping surface 314 of the second clamp member 304 further defines a curved or conical protrusion 320 surrounding a slot opening 318. The protrusion 320 includes a depth (P) about 0.5 mm from the clamping surface 314 of the second clamp member 304 and includes a diameter (X) smaller than the first diameter (D) of the first clamp member 302 so that the protrusion 320 fits closely into the opening 310 of the first clamp member 302. The opening 310 of the first clamp member 302 defines a curved or conical recess 321 configured to receive the protrusion 320 of the second clamp member 304.

A pair of guide members 322 extends through the second clamp member 304 and the first clamp member 302. The second clamp member 304 is moveable along the guide members 322 in a first direction away from the first clamp member 302 to allow for the placement of the battery foil-tab assembly 120 onto the clamping surface of the first clamp member 302. The second clamp member 304 is moveable along the guide members 322 in a second direction, opposite the first direction, toward from the first clamp member 302. The clamp arm 306 is provided to selectively exert a clamping force F onto the second clamp member 304 such that a stacked battery foil-tab assembly 120 may be compressed between the first clamp member 302 and the second clamp member 304. FIG. 6 shows a plurality of slot openings 318 oriented to facilitate a plurality of laser spot welds across a width W of the battery foil-tab assembly 120. It is appreciated that the arrangements of slot openings 318 are not limited to extending the width W of the battery foil-tab assembly 120.

In implementing the method 200, a battery foil-tab assembly 120 is placed into position onto the first clamp member 302. The second clamp member 304 is moved toward the first clamp member 302 along the guide members 322 so that the clamping surface 314 of the second clamp member 304 is in contact with the battery foil-tab assembly 120. Once in position, the slot openings 318 of the second clamp member 304 are co-axially aligned with the openings 310 of the first clamp member 302. The clamping arm 306 then applies a clamping force onto the second clamp member 304 to compress the battery foil-tab assembly 120 between the first clamp member 302 and second clamp member 304. The clamp arm 306 applies a sufficient force so that conical protrusions 320 of the second clamp member 304 urges the predetermined laser weld sites 126 to deflect or plastically deform out of plane-A into the openings 310 of the first clamp member 302.

While the predetermined laser weld sites 126 are deformed out of a plane-A, a laser beam 128 is directed through the slot openings 318 of the first clamp member 302 and onto the predetermined laser weld sites 126. The laser beam 128 is operated at a predetermined laser weld schedule sufficient to effectual a laser weld joining the battery foils 108 to the battery tab 110 in the overlap portion 122. The opening 310 located in the first clamp member 302 is sufficient deep to prevent the laser beam 128 from welding the battery foil-tab assembly 120 to the first clamp member 302.

Upon solidification of the laser weld, the lever member is disengaged and the second member is moved along the guide members 322 apart from the first clamp member 302, there thereby releasing the laser welded battery foil-tab assembly 120 from the fixture 300.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A clamping fixture for welding a battery foil-tab assembly, comprising:
    a first clamp member having a first clamping surface defining an opening extending into the first clamp member, wherein the first clamping surface is configured to receive the battery foil-tab assembly covering the opening; and
    a second clamp member having an exterior surface, a second clamping surface opposite the exterior surface, and a weld slot extending from the exterior surface to the second clamping surface, wherein the second clamping surface defines a protrusion surrounding the weld slot;
    wherein the second clamp member is moveable toward the first clamp member to align the weld slot of the second clamp member with the opening of the first clamp member, and
    wherein the protrusion surrounding the weld slot of the second clamp member is configured cooperate with the opening of the first clamp member to deflect a portion of the battery foil-tab assembly out of a plane parallel with the battery foil-tab assembly.

2. The clamping fixture of claim 1, wherein the protrusion surrounding the weld slot of the second clamp member is configured cooperate with the opening of the first clamp member to plastically deform the portion of the battery foil-tab assembly.

3. The clamping fixture of claim 1, wherein the portion of the battery foil-tab assembly is a predetermined weld site.

4. The clamping fixture of claim 1, wherein the protrusion extends about 0.5 mm from the second clamping surface of the second clamp member.

5. The clamping fixture of claim 4, wherein the opening of the first clamp member defines a recess configured to receive the protrusion of the second clamp member, wherein the recess includes a shape complementary to a shape of the protrusion.

6. The clamping fixture of claim 1, wherein the opening of the first clamp member and the weld slot of the first clamp member includes a diameter sufficiently large to receive a laser beam effective to form a laser weld through the battery foil-tab assembly.

7. The clamping fixture of claim 6, further comprising a lever member configured to selectively apply a force to the exterior surface of the second clamp member urging the second clamp member toward the first clamp member to clamp the battery foil-tab assembly therebetween.

8. The clamping fixture of claim 7, wherein the protrusion of the second clamp member is configured to cooperate with the opening of the first clamp member to deflect an overlap portion of the battery foil-tab assembly out of the plane.

9. The clamping fixture of claim 6, further comprising a guide member configured to guide the second clamp member toward and apart from the first clamp member.

10. The clamping fixture of claim 6, wherein the opening extending into the first clamp member is sufficiently deep to prevent the laser beam from welding the battery foil-tab assembly to the first clamp member.

11. A method for laser welding a battery foil-tab assembly, comprising
    disposing the battery foil-tab assembly onto a first clamp member having an opening, wherein the battery foil-tab assembly includes a faying interface parallel with a plane-A;
    disposing a second clamp member onto the battery foil-tab assembly and against the first clamp member, wherein the second clamp member includes a weld slot in axial alignment with the opening of the first clamp member and a protrusion surrounding the weld slot;
    applying a clamping force onto the second clamp member to cause the protrusion to deflect a portion of the battery foil-tab assembly out of the plane-A;
    and directing a laser beam at the portion of the battery foil-tab assembly out of the plane-A to effectuate a laser weld.

12. The method of claim 11, wherein the protrusion is insertable into the opening of the first clamp member thereby deflecting the portion of the battery foil-tab assembly into the opening.

13. The method of claim 12, wherein deflecting the portion of the battery foil-tab assembly includes plastic deformation of the portion of the battery foil-tab assembly.

14. The method of claim 13, wherein the portion of the battery foil-tab assembly plastically deformed is a predetermined laser weld site.

* * * * *